US011597278B2

(12) United States Patent
Sunaga et al.

(10) Patent No.: US 11,597,278 B2
(45) Date of Patent: Mar. 7, 2023

(54) PROJECTION CONTROL DEVICE, HEAD-UP DISPLAY DEVICE, PROJECTION CONTROL METHOD, AND NON-TRANSITORY STORAGE MEDIUM

(71) Applicant: JVCKENWOOD Corporation, Yokohama (JP)

(72) Inventors: Ryohei Sunaga, Yokohama (JP); Makoto Kurihara, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 342 days.

(21) Appl. No.: 16/891,099

(22) Filed: Jun. 3, 2020

(65) Prior Publication Data

US 2020/0290458 A1    Sep. 17, 2020

Related U.S. Application Data

(63) Continuation of application No. PCT/JP2018/037515, filed on Oct. 9, 2018.

(30) Foreign Application Priority Data

Dec. 6, 2017  (JP) .............................. JP2017-234458

(51) Int. Cl.
*B60K 35/00* (2006.01)
*G02B 27/00* (2006.01)
*G02B 27/01* (2006.01)

(52) U.S. Cl.
CPC .......... *B60K 35/00* (2013.01); *G02B 27/0093* (2013.01); *G02B 27/0101* (2013.01);
(Continued)

(58) Field of Classification Search
None
See application file for complete search history.

(56) References Cited

U.S. PATENT DOCUMENTS

| 2005/0083248 A1* | 4/2005 | Biocca | G02B 27/0172 |
| | | | 348/E13.071 |
| 2009/0237803 A1* | 9/2009 | Hotta | G02B 3/005 |
| | | | 359/630 |

(Continued)

FOREIGN PATENT DOCUMENTS

| JP | 2007-099199 | 4/2007 |
| JP | 2012-163613 | 8/2012 |
| JP | 2017-026675 | 2/2017 |

OTHER PUBLICATIONS

International Search Report and Written Opinion for International Patent Application No. PCT/JP2018/037515 dated Jan. 8, 2019, 13 pages.

*Primary Examiner* — Christopher R Lamb
(74) *Attorney, Agent, or Firm* — Amin, Turocy & Watson, LLP

(57) ABSTRACT

A projection control device includes a projection controller configured to control a projector of a head-up display device to project a display image such that a virtual image thereof is viewed in front of a viewer, a video data acquisition unit configured to acquire a captured video captured by an imager capable of capturing a video of the viewer, and a detection unit configured to detect a relative positional relationship of a pupil position of the viewer with respect to the virtual image, wherein the projection control unit is further configured to control the projector to project a reference position determination image on the viewer, and the detection unit is further configured to detect the relative positional relationship of the pupil position of the viewer with respect to the virtual image based on the captured video obtained by capturing the reference position determination video projected on the viewer.

6 Claims, 13 Drawing Sheets

(52) U.S. Cl.
CPC .. *B60K 2370/1529* (2019.05); *B60K 2370/31* (2019.05); *B60K 2370/334* (2019.05); *B60K 2370/73* (2019.05); *B60K 2370/92* (2019.05); *G02B 2027/0138* (2013.01)

(56) References Cited

U.S. PATENT DOCUMENTS

| | | | | |
|---|---|---|---|---|
| 2012/0169591 | A1* | 7/2012 | Moriya | B60K 35/00 345/156 |
| 2013/0194110 | A1* | 8/2013 | Kim | G06V 40/165 340/905 |
| 2016/0117554 | A1* | 4/2016 | Kang | H04N 13/117 348/78 |

* cited by examiner

PROJECTION CONTROL DEVICE, HEAD-UP DISPLAY DEVICE, PROJECTION CONTROL METHOD, AND NON-TRANSITORY STORAGE MEDIUM

CROSS-REFERENCE TO RELATED APPLICATIONS

This application is a Continuation of PCT International Application No. PCT/JP2018/037515 filed on Oct. 9, 2018 which claims the benefit of priority from Japanese Patent Application No. 2017-234458 filed on Dec. 6, 2017, the entire contents of both of which are incorporated herein by reference.

FIELD

The present application relates to a projection control device, a head-up display device, a projection control method, and a non-transitory storage medium.

BACKGROUND

A head-up display device that projects information provided to a driver, such as route guide information or speed information, as a virtual image in front of a line of sight of the driver has been known. The head-up display device needs to set a display position of the virtual image at a correct position with respect to the viewer so that the viewer can accurately view the virtual image.

A technique for moving a moving target screen by matching a line of sight and a finger pointing direction with a display screen and moving the line of sight and the finger pointing direction to a desired position has been known (for example, see Japanese Laid-open Patent Publication No. 2007-099199 A). Also a technique that is provided with a combiner, an infrared illumination device, and an image sensor for capturing an image of a face of a driver illuminated with infrared light, and that detects a line of sight and a face direction of the driver has been known (for example, see Japanese Laid-open Patent Publication No. 2017-026675 A).

In the head-up display device, in order to accurately set the display position of the virtual image to a correct position with respect to the viewer, it is preferable to detect a relative positional relationship of a pupil position of the viewer with respect to the virtual image.

SUMMARY

A projection control device, a head-up display device, a projection control method, and a non-transitory storage medium are disclosed.

According to one aspect, there is provided a projection control device comprising: a projection controller configured to control a projector of a head-up display device to project a display image such that a virtual image thereof is viewed in front of a viewer; a video data acquisition unit configured to acquire a captured video that is captured by an imager capable of capturing a video of the viewer; and a detection unit configured to detect a relative positional relationship of a pupil position of the viewer with respect to the virtual image, wherein the projection control unit is further configured to control the projector to project a reference position determination image on the viewer, and the detection unit is further configured to detect the relative positional relationship of the pupil position of the viewer with respect to the virtual image based on the captured video that is acquired by the video data acquisition unit and that is obtained by capturing the reference position determination video projected on the viewer.

According to one aspect, there is provided a projection control method comprising: controlling a projector of a head-up display device to project a display image such that a virtual image thereof is viewed in front of a viewer; acquiring a captured video that is captured by an imager capable of capturing a video of the viewer; and detecting a relative positional relationship of a pupil position of the viewer with respect to the virtual image, wherein the controlling further includes controlling the projector to project a reference position determination image on the viewer, and the detecting further includes detecting the relative positional relationship of the pupil position of the viewer with respect to the virtual image based on the captured video that is acquired by the video data acquisition unit and that is obtained by capturing the reference position determination video projected on the viewer.

According to one aspect, there is provided a non-transitory computer readable storage medium that stores a computer program for causing a computer to execute: controlling a projector of a head-up display device to project a display image such that a virtual image thereof is viewed in front of a viewer; acquiring a video data that is captured by an imager capable of capturing a video of the viewer; and detecting a relative positional relationship of a pupil position of the viewer with respect to the virtual image, wherein the controlling further includes controlling the projector to project a reference position determination image on the viewer, and the detecting further includes detecting the relative positional relationship of the pupil position of the viewer with respect to the virtual image based on the captured video that is acquired by the video data acquisition unit and that is obtained by capturing the reference position determination video projected on the viewer.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

Embodiments of a projection control device, a head-up display device (hereinafter, referred to as an "HUD device"), a projection control method, and a non-transitory storage medium according to the present application will be described in detail below with reference to the accompanying drawings. The present application is not limited to the embodiments below. In the following descriptions, a case will be described in which the present application is used for a vehicle. Further, it is explained that a viewer is a driver.

First Embodiment

Figure 1:
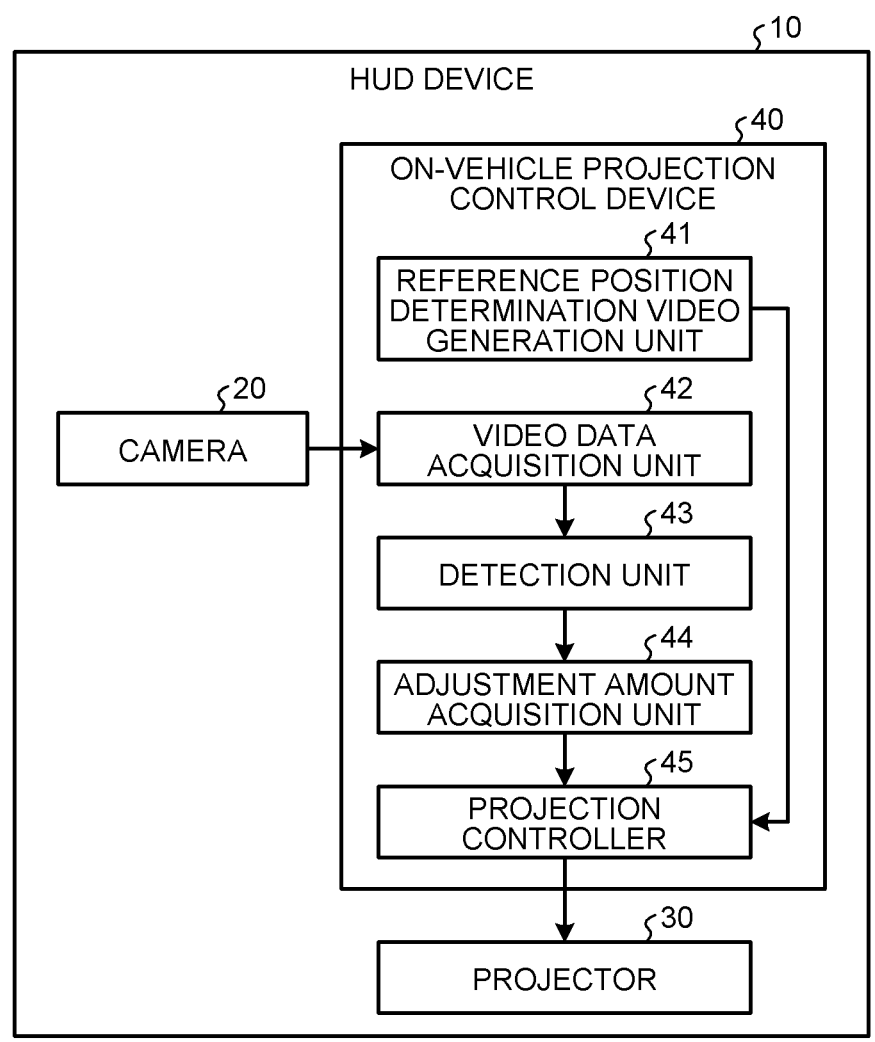
FIG. 1 is a block diagram illustrating a configuration example of an on-vehicle projection control device according to a first embodiment.
Figure 2:
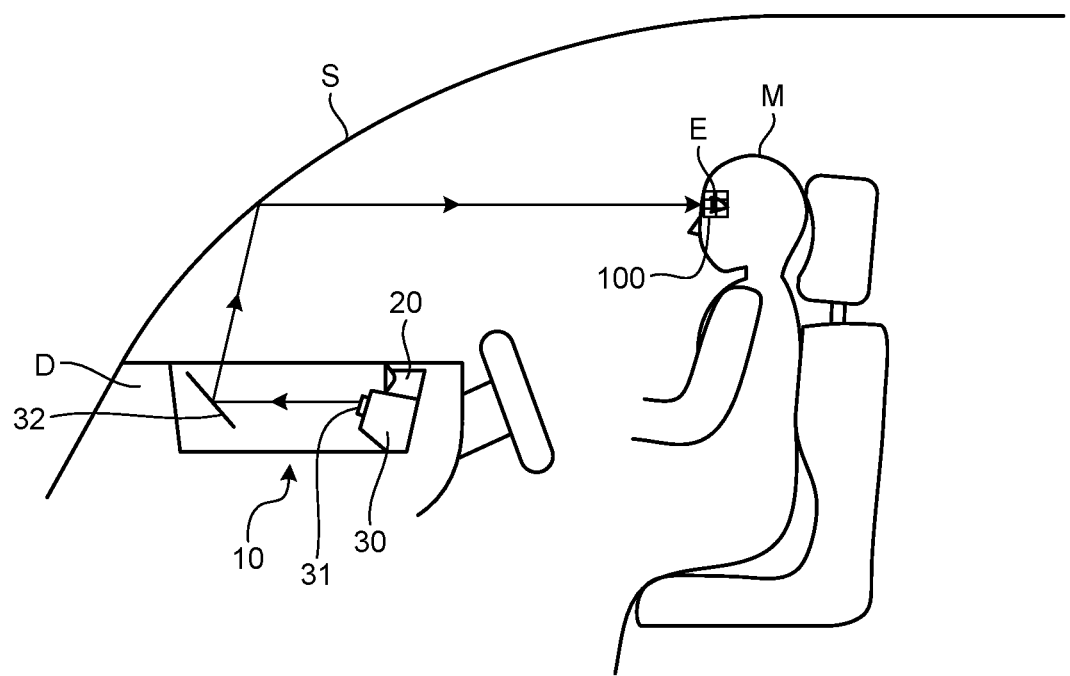
FIG. 2 is a schematic diagram illustrating a configuration example of a head-up display device according to the first embodiment.

FIG. 1 is a block diagram illustrating a configuration example of an on-vehicle projection control device according to a first embodiment. FIG. 2 is a schematic diagram illustrating a configuration example of a head-up display device according to the first embodiment. At the time of normal use, for example, an HUD device 10 projects a display image 200 that includes a route guide video or a speed information video, and causes a virtual image of the display image 200 to be visible on a front of the vehicle. At the time of position adjustment thereof, the HUD device 10 is able to detect a pupil position of a driver M by projecting a projected light of a reference position determination image 100 onto a face of the driver M, and adjust a display position of the virtual image. The HUD device 10 includes a camera 20, a projector 30, and an on-vehicle projection control device 40. In the first embodiment, the camera 20, the projector 30, and the on-vehicle projection control device 40 are integrally arranged below a dashboard D of the vehicle.

The camera 20 captures a video of a face of the driver M who is sitting on a driver's seat. More specifically, the camera 20 captures, as captured video data, the reference position determination image 100 that is output toward the face of the driver M and projected on the face of the driver M. In other words, the face of the driver M and the reference position determination image 100 appear in the captured video data that is captured by the camera 20. The camera 20 outputs the captured video data to a video data acquisition unit 42 of the on-vehicle projection control device 40.

The projector 30 projects a display image 200 or the reference position determination image 100. In the first embodiment, the projector 30 includes a display unit 31, a concave mirror 32, and a reflector. In the first embodiment, the reflector is a windshield S. At the time of normal use, the projector 30 causes a projected light of the display image 200 to be reflected by the windshield S and to be viewed as a virtual image by the driver M. Further, at the time of position adjustment thereof, the projector 30 causes a projected light of the reference position determination image 100 to be reflected by the windshield S and to be projected on the face of the driver M. The projector 30 causes the projected light of the display image 200 at the time of normal use and the projected light of the reference position determination image 100 at the time of position adjustment to pass through the same optical path and projects them at the same projection position.

The display unit 31 is a display including, for example, a liquid crystal display (LCD) or an organic electro luminescence (EL) display. At the time of normal use, the display unit 31 displays, on a display surface, the display image 200 based on a video signal that is obtained from a projection control unit 45 of the on-vehicle projection control device 40. At the time of position adjustment, the display unit 31 displays, on the display surface, the reference position determination image 100 based on the video signal that is obtained from the projection control unit 45 of the on-vehicle projection control device 40. The projected light of the display image 200 or the reference position determination image 100 displayed on the display surface of the display unit 31 enters the concave mirror 32.

The concave mirror 32 is arranged so as to face the display surface of the display unit 31 and the windshield S. The concave mirror 32 in a convex shape is curved forward in a traveling direction of the vehicle. The concave mirror 32 reflects, toward the windshield S, the projected light that has entered from the display surface of the display unit 31.

The windshield S is arranged in front of the driver's seat in the traveling direction. The windshield S in a convex shape is curved forward in the traveling direction of the vehicle. At the time of normal use, the windshield S reflects the projected light of the display image 200 that has entered from the concave mirror 32, and allows the driver M to recognize the projected light as a virtual image. At the time of position adjustment, the windshield S reflects the projected light of the reference position determination image 100 that has entered from the concave mirror 32, and projects the reference position determination image 100 on the face of the driver M.

The on-vehicle projection control device 40 controls projection of the display image 200 or the reference position determination image 100 projected by the projector 30. The on-vehicle projection control device 40 is, for example, an arithmetic processing device that includes a central processing unit (CPU) or the like. The on-vehicle projection control device 40 loads a program stored in a storage (not illustrated) to a memory, and executes commands included in the program. The on-vehicle projection control device 40 includes a reference position determination image generation unit 41, the image data acquisition unit 42, a detection unit 43, an adjustment amount acquisition unit 44, and the projection control unit 45. The on-vehicle projection control device 40 includes an internal memory (not illustrated), and the internal memory is used to temporarily store data in the on-vehicle projection control device 40.

The reference position determination image generation unit 41 generates the reference position determination image 100 that is projected by the projector 30 of the HUD device 10.

The reference position determination image 100 is an image of a mark indicating a reference position that is used to detect the pupil position of the driver M. The projected light of the reference position determination image 100 passes through the same optical path as an optical path of the projected light of the display image 200 that is applied at the time of normal use, and is projected at the same position as a projection position of the display image 200. The reference position determination image 100 is an image with higher luminance than that of the display image 200. More specifically, the reference position determination image 100 has certain luminance that allows the projected light to be reflected by the windshield S and projected on the face of the driver M.

The reference position determination image 100 is an image that is used to detect a relative positional relationship of the pupil position of the driver M with respect to the virtual image of the display image 200. More specifically, the reference position determination image 100 is an image that is used to detect at least one of a vertical position and a horizontal position of the pupil position of the driver M with respect to the virtual image of the display image 200. The reference position determination image 100 includes at least one of a first reference position determination image 101 that indicates a reference position in a vertical direction and a second reference position determination image 102 that indicates a reference position in a horizontal direction. The reference position determination image 100 has a frame shape, a lattice shape, or a linear shape, for example.

Figure 3:
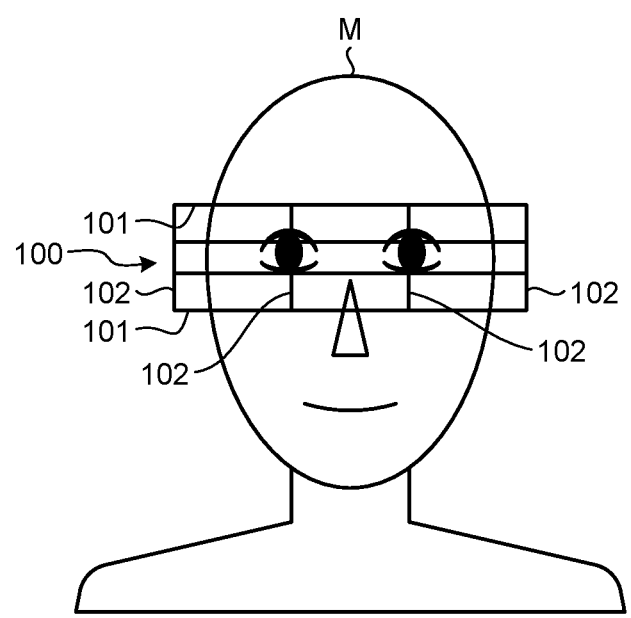
FIG. 3 is a diagram illustrating an example of a reference position determination image displayed by the on-vehicle projection control device according to the first embodiment.
Figure 4:
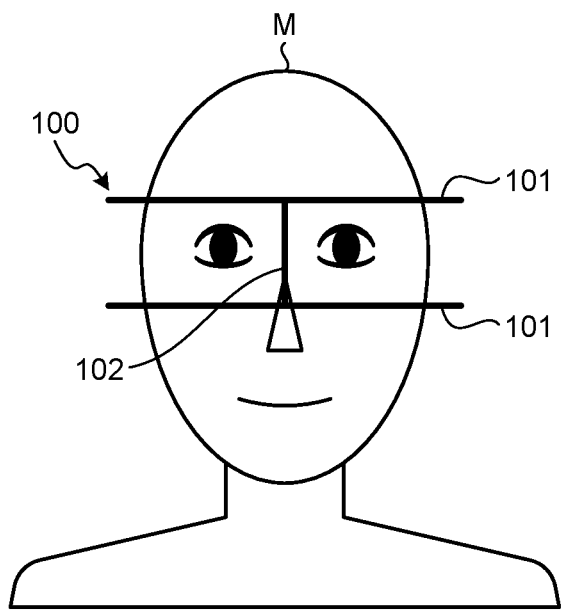
FIG. 4 is a diagram illustrating another example of the reference position determination image displayed by the on-vehicle projection control device according to the first embodiment.

The reference position determination image 100 will be described with reference to FIG. 3 and FIG. 4. FIG. 3 is a diagram illustrating an example of the reference position determination image displayed by the on-vehicle projection control device according to the first embodiment. FIG. 4 is a diagram illustrating another example of the reference position determination image displayed by the on-vehicle projection control device according to the first embodiment. As illustrated in FIG. 3, the reference position determination image 100 may have a lattice shape formed of a pair of the first reference position determination images 101 and the four second reference position determination images 102. As illustrated in FIG. 4, the reference position determination image 100 may have a rotated-H shape formed of a pair of the first reference position determination images 101 and the single second reference position determination image 102.

The image data acquisition unit 42 acquires captured video data output by the camera 20. The image data acquisition unit 42 outputs the acquired captured video data to the detection unit 43.

The detection unit 43 performs an image processing on the captured video data, and detects a relative positional relationship between the reference position determination image 100 and the pupils of the driver M. More specifically, the detection unit 43 detects at least one of the vertical position and the horizontal position of the pupil position of the driver M with respect to the virtual image of the display image 200 based on the pupil position of the driver M and the reference position determination image 100 in the captured video data. In this manner, the detection unit 43 detects the relative positional relationship of the pupil position of the driver M with respect to the virtual image of the display image 200.

Figure 5:
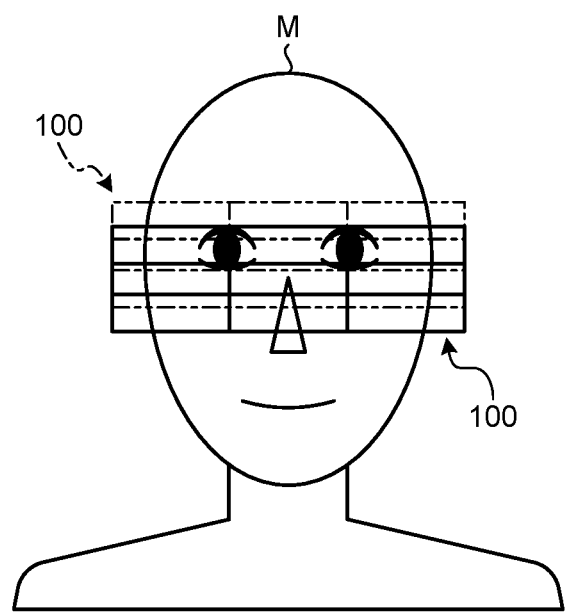
FIG. 5 is a diagram illustrating an example of a pupil position of a driver detected by the on-vehicle projection control device according to the first embodiment.
Figure 6:
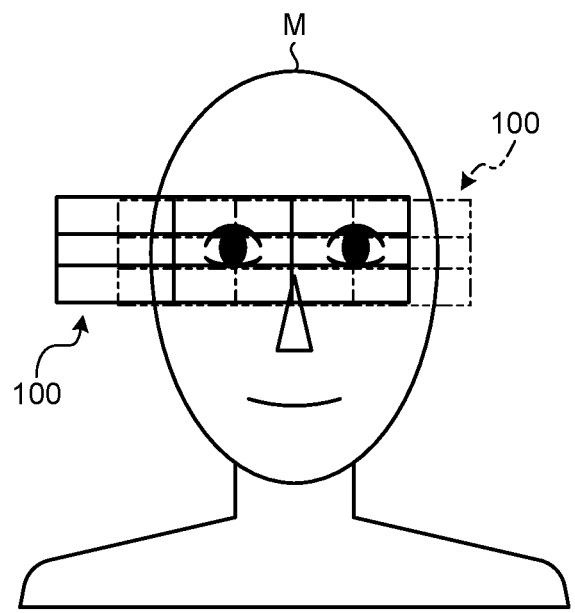
FIG. 6 is a diagram illustrating another example of the pupil position of the driver detected by the on-vehicle projection control device according to the first embodiment.

The relative positional relationship of the pupil position of the driver M with respect to the virtual image of the display image 200 will be described with reference to FIG. 3 to FIG. 6. FIG. 5 is a diagram illustrating an example of the pupil position of the driver detected by the on-vehicle projection control device according to the first embodiment. FIG. 6 is a diagram illustrating another example of the pupil position of the driver detected by the on-vehicle projection control device according to the first embodiment. FIG. 3 illustrates a state in which the pupil position of the driver M is not misaligned with respect to the reference position determination image 100. As illustrated in FIG. 3, when the reference position determination image 100 has a lattice shape, and if the pupils of the driver M are located in an intermediate portion of the pair of first reference position determination image 101 and the pupils of the driver M are located so as to overlap the two second reference position determination images 102 that are located in the center, the detection unit 43 detects that the pupil position of the driver M is not misaligned. Further, if the pupils of the driver M are not located in the intermediate portion of the pair of first reference position determination images 101 or if the pupils of the driver M are not located so as to overlap the two second reference position determination images 102 that are located in the center, the detection unit 43 detects that the pupil position of the driver M is misaligned. Furthermore, the detection unit 43 detects a misalignment amount of the pupil position of the driver M.

FIG. 4 illustrates a state in which the pupil position of the driver M is not misaligned with respect to the reference position determination image 100. As illustrated in FIG. 4, when the reference position determination image 100 has a rotated-H shape, and if the pupils of the driver M are located in an intermediate portion of the pair of first reference position determination image 101 and the single second reference position determination image 102 is located in an intermediate portion between the pupils of the driver M, the detection unit 43 detects that the pupil position of the driver M is not misaligned. Further, if the pupils of the driver M are not located in the intermediate portion of the pair of first reference position determination image 101 or if the single second reference position determination image 102 is not located in the intermediate portion between the pupils of the driver M, the detection unit 43 detects that the pupil position of the driver M is misaligned. Furthermore, the detection unit 43 detects a misalignment amount of the pupil position of the driver M.

In this manner, in the states as illustrated in FIG. 3 and FIG. 4, the detection unit 43 detects that the pupil position of the driver M is not misaligned in the vertical direction and the horizontal direction with respect to the reference position determination image 100. The pupil position of the driver M is not misaligned in the vertical direction and the horizontal direction even with respect to the virtual image of the display image 200 that is projected at the same position as the reference position determination image 100.

FIG. 5 illustrates a state in which the pupil position of the driver M is misaligned with respect to the reference position determination image 100. A dashed line indicates the reference position determination image 100 that is located at an appropriate position with respect to the pupil position of the driver M. The detection unit 43 detects that the pupil position of the driver M is misaligned in the vertical direction because the pupils of the driver M is not located in the intermediate portion of the pair of first reference position determination images 101. The pupil position of the driver M is misaligned in the vertical direction even with respect to the virtual image of the display image 200 that is projected at the same position as the reference position determination image 100.

FIG. 6 illustrates a state in which the pupil position of the driver M is misaligned with respect to the reference position determination image 100. A dashed line indicates the reference position determination image 100 that is located at an appropriate position with respect to the pupil position of the driver M. The detection unit 43 detects that the pupil position of the driver M is misaligned in the horizontal direction because the pupils of the driver M is not located so as to overlap the two second reference position determination images 102 that are located in the center. The pupil position of the driver M is misaligned in the horizontal direction even with respect to the virtual image of the display image 200 that is projected at the same position as the reference position determination image 100.

The adjustment amount acquisition unit 44 acquires an adjustment amount of the projection position of the display image 200, based on the misalignment amount of the pupil position of the driver M detected by the detection unit 43. More specifically, as illustrated in FIG. 5, if the pupil position of the driver M is located on an upper side with respect to the reference position determination image 100, the adjustment amount acquisition unit 44 acquires an adjustment amount by which the projection position is moved upward to an appropriate position. As illustrated in FIG. 6, if the pupil position of the driver M is located in a leftward direction of the driver M with respect to the reference position determination image 100, the adjustment amount acquisition unit 44 acquires an adjustment amount by which the projection position is moved in the leftward direction of the driver M to an appropriate position.

At the time of normal use, the projection control unit 45 controls projection of the display image 200 such that the virtual image of the display image 200 is viewed on the front of the vehicle. At the time of position adjustment, the projection control unit 45 controls projection of the reference position determination image 100 such that the projected light of the reference position determination image 100 is projected on the face of the driver M. The projection control unit 45 projects the display image 200 and the reference position determination image 100 using the same optical path.

Figure 7:
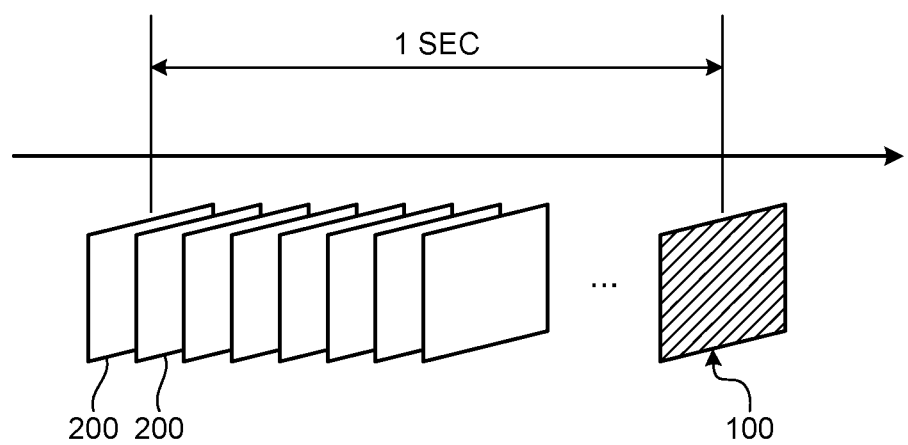
FIG. 7 is a diagram for explaining images projected by the on-vehicle projection control device according to the first embodiment.

As illustrated in FIG. 7, the projection control unit 45 may perform control such that the reference position determination image 100 is projected in a single frame and the display image 200 is projected in remaining frames in one second, for example. FIG. 7 is a diagram for explaining images projected by the on-vehicle projection control device according to the first embodiment. The reference position determination image 100 is projected in only a single frame in one second, and therefore, it is possible to adjust a position without making the driver M aware that the projected light of the reference position determination image 100 is projected on the face of the driver M. In the first embodiment, it is assumed that the projection control unit 45 projects the reference position determination image 100 only in a single frame in one second.

Alternatively, for example, as the time of position adjustment, when the driver M performs position adjustment start operation at a start of driving, the projection control unit 45 may project the reference position determination image 100. Further, as the time of normal use, while the driver M does not perform the operation, the projection control unit 45 performs control such that the display image 200 is projected.

Figure 8:
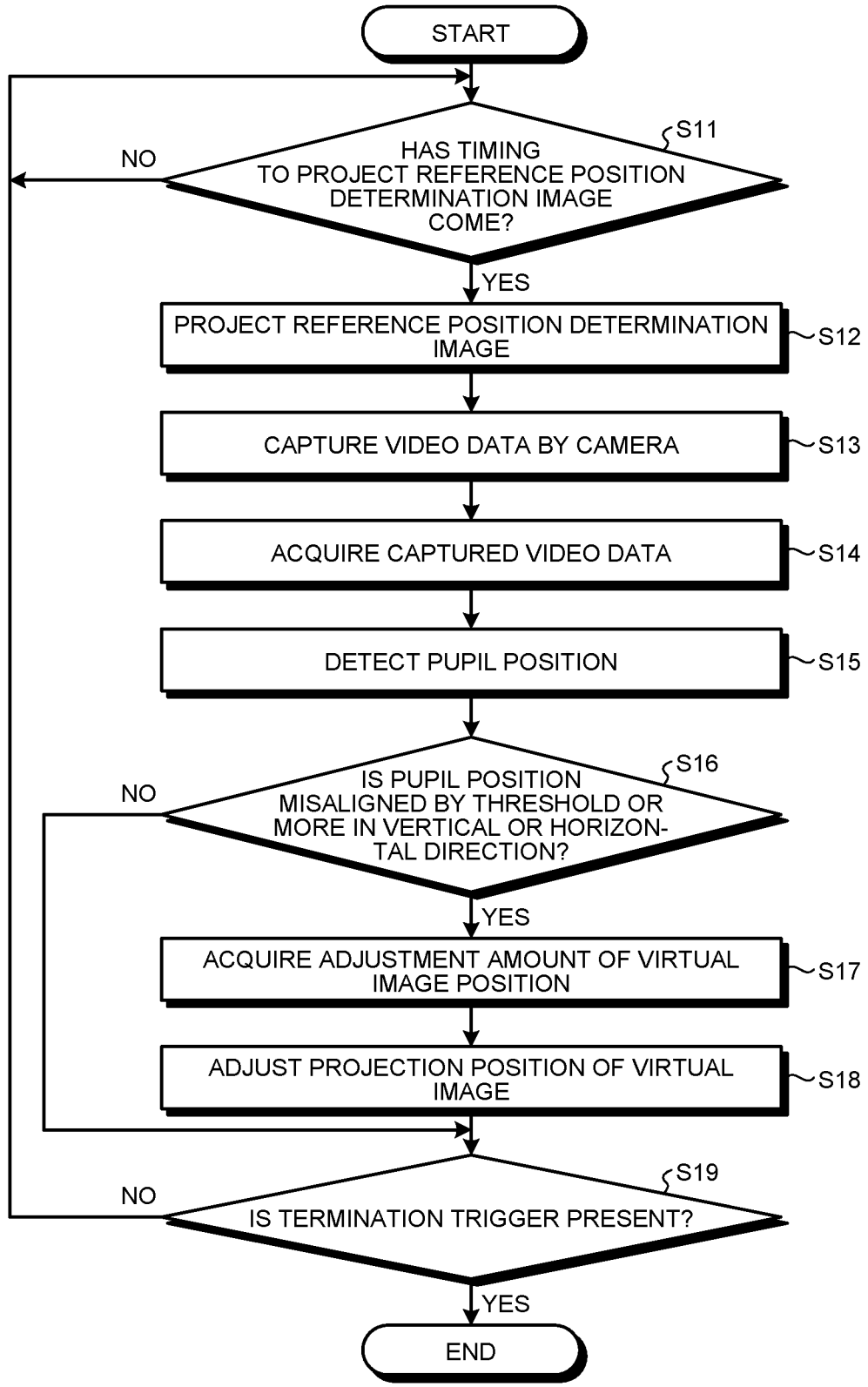
FIG. 8 is a flowchart illustrating a flow of processes performed by the on-vehicle projection control device according to the first embodiment.

A flow of processes performed by the on-vehicle projection control device 40 will be described below with reference to FIG. 8. FIG. 8 is a flowchart illustrating the flow of the processes performed by the on-vehicle projection control device according to the first embodiment. In the first embodiment, a case will be described in which the on-vehicle projection control device 40 projects the reference position determination image 100 in a single frame in one second and projects the display image 200 in remaining frames in one second while the HUD device 10 is activated.

The on-vehicle projection control device 40 determines whether a timing to project the reference position determination image 100 has come (Step S11). More specifically, the on-vehicle projection control device 40 counts frames in one second and determines whether the timing to project the reference position determination image 100 has come. When the timing to project the reference position determination image 100 has come (Yes at Step S11), the on-vehicle projection control device 40 proceeds to Step S12. When the timing to project the reference position determination image 100 has not come (No at Step S11), the on-vehicle projection control device 40 performs the process at Step S11 again.

When it is determined that the timing to project the reference position determination image 100 has come (Yes at Step S11), the on-vehicle projection control device 40 projects the reference position determination image 100 (Step S12). More specifically, the on-vehicle projection control device 40 controls the projection control unit 45 to output a control signal for projecting the reference position determination image 100 generated by the reference position determination image generation unit 41. The on-vehicle projection control device 40 proceeds to Step S13.

The on-vehicle projection control device 40 performs capturing video data using the camera 20 (Step S13). More specifically, the on-vehicle projection control device 40 controls the camera 20 to capture, as captured video data, the reference position determination image 100 that is projected on the face of the driver M. The on-vehicle projection control device 40 proceeds to Step S14.

The on-vehicle projection control device 40 acquires the captured video data (Step S14). More specifically, the on-vehicle projection control device 40 controls the video data acquisition unit 42 to acquire the captured video data that is captured by the camera 20. The on-vehicle projection control device 40 proceeds to Step S15.

The on-vehicle projection control device 40 detects the pupil position (Step S15). More specifically, the on-vehicle projection control device 40 controls the detection unit 43 to perform the image processing on the captured video data and detects the relative positional relationship between the reference position determination image 100 and the pupils of the driver M. The on-vehicle projection control device 40 controls the detection unit 43 to detect a misalignment amount of the pupil position of the driver M. The on-vehicle projection control device 40 proceeds to Step S16.

The on-vehicle projection control device 40 determines whether the pupil position is misaligned by a threshold or more in the vertical direction or in the horizontal direction (Step S16). More specifically, when the misalignment amount of the pupil position of the driver M in the vertical direction or in the horizontal direction, which is detected by the detection unit 43, is equal to or larger than the threshold (Yes at Step S16), the on-vehicle projection control device 40 proceeds to Step S17. When the misalignment amount of the pupil position of the driver M in the vertical direction or in the horizontal direction, which is detected by the detection unit 43, is not equal to or larger than the threshold (No at Step S16), the on-vehicle projection control device 40 proceeds to Step S19.

When it is determined that the misalignment amount of the pupil position of the driver M in the vertical direction or in the horizontal direction is equal to or larger than the threshold (Yes at Step S16), the on-vehicle projection control device 40 acquires an adjustment amount of a virtual image position (Step S17). More specifically, the on-vehicle projection control device 40 controls the adjustment amount acquisition unit 44 to acquire the adjustment amount of the projection position of the display image 200, based on the misalignment amount of the pupil position of the driver M detected by the detection unit 43. The on-vehicle projection control device 40 proceeds to Step S18.

The on-vehicle projection control device 40 adjusts the projection position of the virtual image (Step S18). The on-vehicle projection control device 40 controls the projection control unit 45 to output the control signal for projecting the reference position determination image 100 for which the position has been adjusted, based on the adjustment amount acquired by the adjustment amount acquisition unit 44. The on-vehicle projection control device 40 proceeds to Step S19.

The on-vehicle projection control device 40 determines whether a termination trigger is present (Step S19). The termination trigger is, for example, pressing of a button for terminating operation of the HUD device 10 or stop of engine due to stop of the vehicle. When the termination trigger is present (Yes at Step S19), the on-vehicle projection control device 40 terminates the processes. When the termination trigger is not present (No at Step S19), the on-vehicle projection control device 40 performs the process at Step S11 again.

Figure 9:
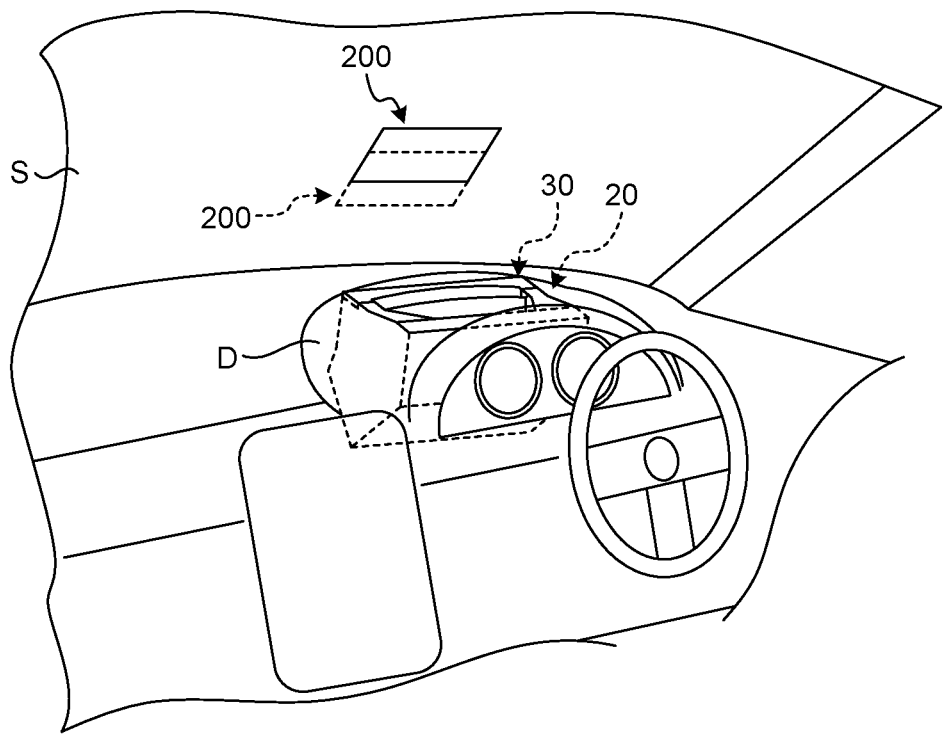
FIG. 9 is a diagram for explaining an image projected by the on-vehicle projection control device according to the first embodiment.

For example, with reference to FIG. 5, a case will be descried in which the pupil position of the driver M is misaligned upward. At Step S18, as illustrated in FIG. 9, the on-vehicle projection control device 40 moves the projection position of the display image 200 upward, so that the display position of the virtual image of the display image 200 is adjusted to an appropriate position with respect to the driver M. FIG. 9 is a diagram for explaining a video projected by the on-vehicle projection control device according to the first embodiment.

Figure 10:
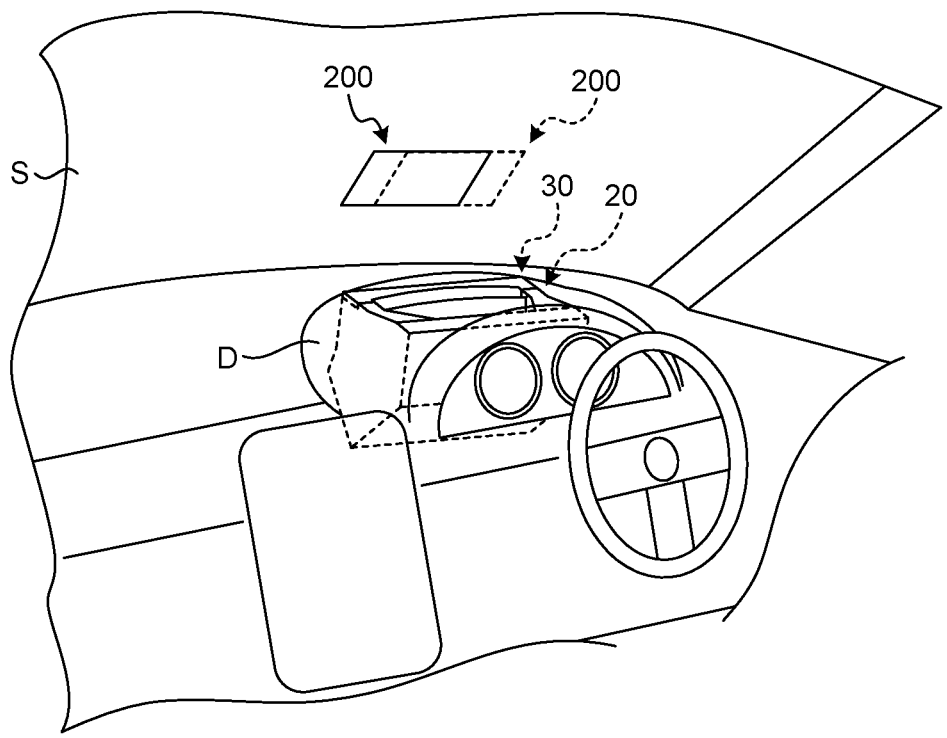
FIG. 10 is a diagram for explaining an image projected by the on-vehicle projection control device according to the first embodiment.

For example, with reference to FIG. 6, a case will be described in which the pupil position of the driver M is misaligned in the leftward direction of the driver M. At Step S18, as illustrated in FIG. 10, the on-vehicle projection control device 40 moves the projection position of the display image 200 in the leftward direction of the driver M, so that the display position of the virtual image of the display image 200 is adjusted to an appropriate position with respect to the driver M. FIG. 10 is a diagram for explaining a video projected by the on-vehicle projection control device according to the first embodiment.

In this manner, the on-vehicle projection control device 40 detects the pupil position of the driver M by projecting the projected light of the reference position determination image 100 onto the face of the driver M. Then, the on-vehicle projection control device 40 adjusts the display position of the virtual image of the display image 200.

As described above, in the first embodiment, the relative positional relationship between the reference position determination image 100 and the pupils of the driver M is detected by projecting the projected light of the reference position determination image 100 onto the face of the driver M. Therefore, in the first embodiment, it is possible to detect the relative positional relationship of the pupil position of the driver M with respect to the virtual image.

In the first embodiment, it is possible to adjust the display position of the virtual image of the display image 200 to an appropriate position with respect to the driver M, based on the detected relative positional relationship of the pupil position of the driver M with respect to the virtual image.

In the first embodiment, the reference position determination image 100 is projected in only a single frame in one second. Therefore, in the first embodiment, it is possible to detect the relative positional relationship of the pupil position of the driver M with respect to the virtual image without making the driver M aware that the projected light of the reference position determination image 100 is projected on the face of the driver M. Further, according to the first embodiment, it is possible to adjust the display position of the virtual image of the display image 200 to an appropriate position with respect to the driver M without making the driver M aware that the projected light of the reference position determination image 100 is projected on the face of the driver M.

In the first embodiment, the projected light of the reference position determination image 100, which passes through the same optical path as the optical path of the projected light of the display image 200 that is applied at the time of normal use and which is projected at the same position as the projection position of the display image 200, is projected on the face of the driver M. In this manner, in the first embodiment, it is possible to directly detect the pupil position of the driver M with respect to the virtual image by projecting the projected light of the reference position determination image 100 onto the face of the driver M.

In the first embodiment, the camera 20, the projector 30, and the on-vehicle projection control device 40 are integrally arranged below the dashboard D of the vehicle. In the first embodiment, it is possible to detect the relative positional relationship of the pupil position of the driver M with respect to the virtual image by using the device that projects the virtual image of the display image 200 at the time of normal use. In the first embodiment, it is not necessary to mount a device different from the device that projects the display image 200 on the dashboard D or the like in the vehicle, so that it is possible to prevent an increase in the size of the device.

Second Embodiment

Figure 11:
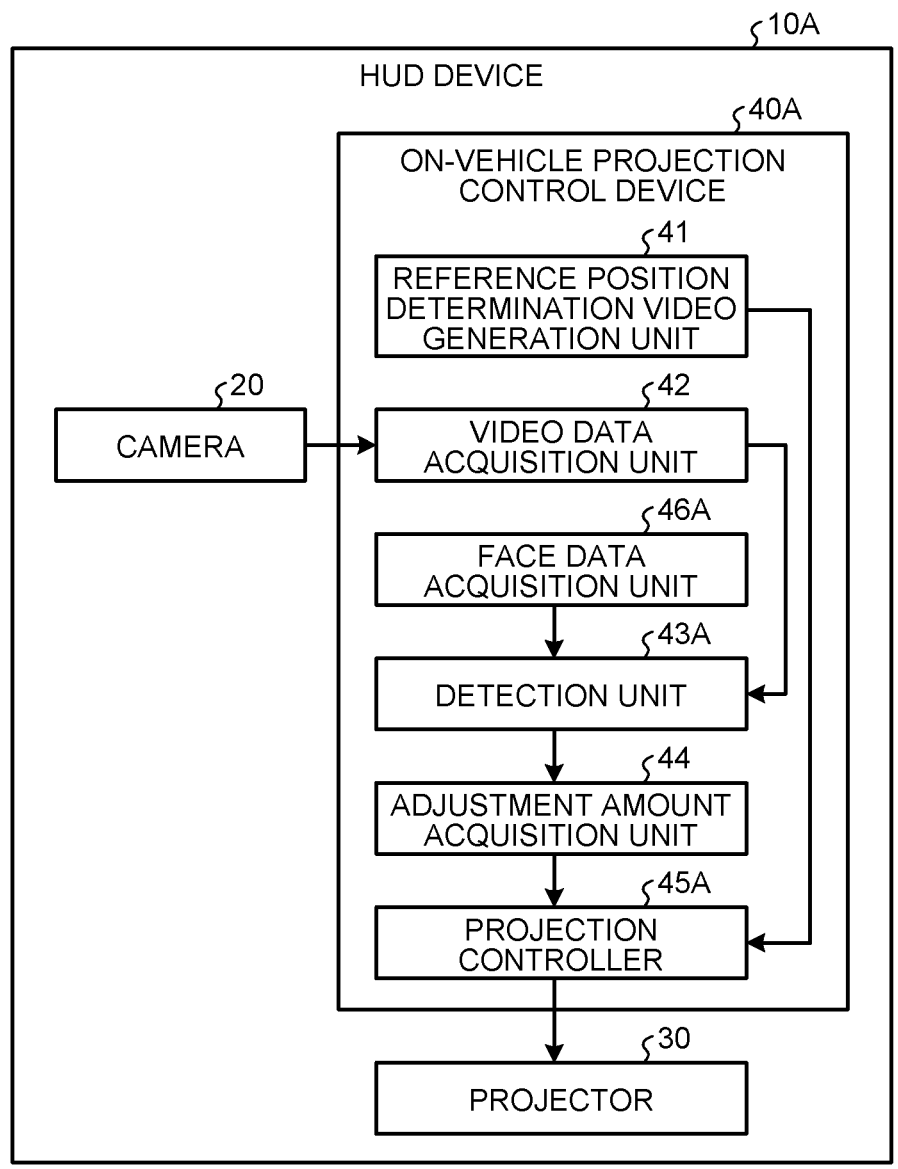
FIG. 11 is a block diagram illustrating a configuration example of an on-vehicle projection control device according to a second embodiment.
Figure 12:
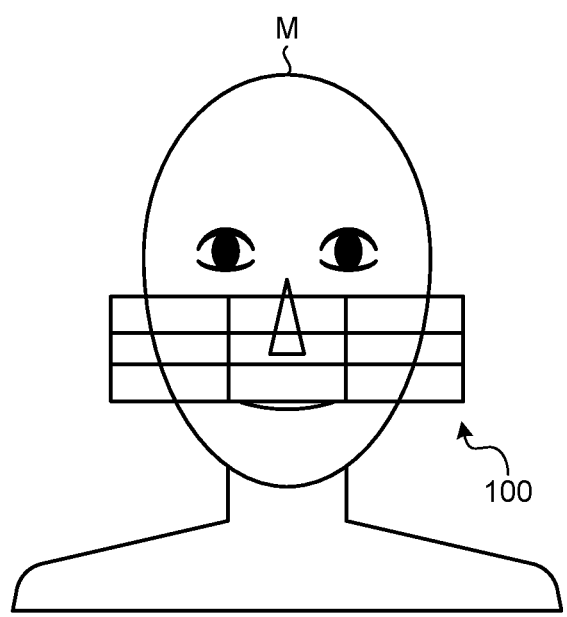
FIG. 12 is a diagram illustrating an example of a reference position determination image displayed by the on-vehicle projection control device according to the second embodiment.
Figure 13:
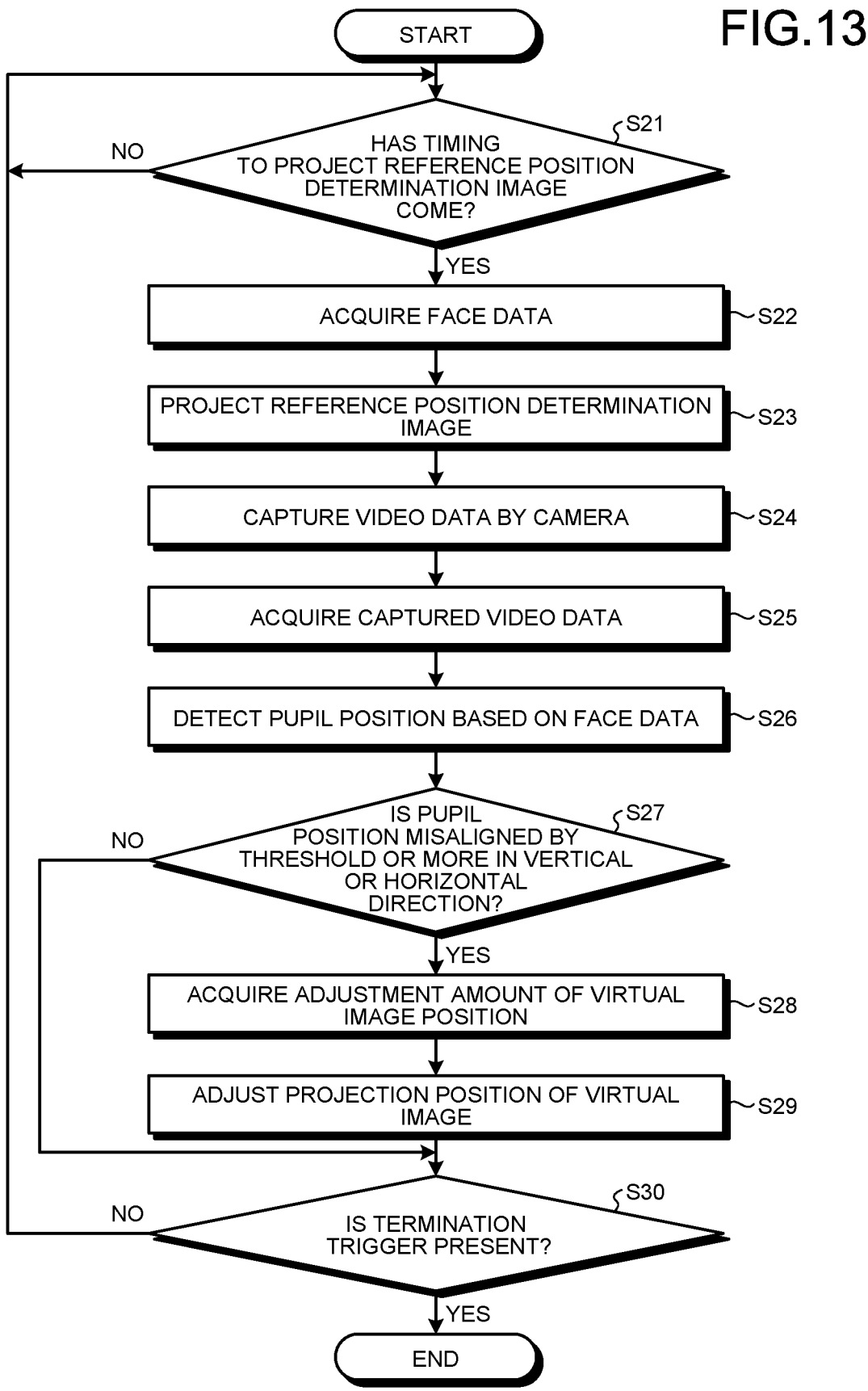
FIG. 13 is a flowchart illustrating a flow of processes performed by the on-vehicle projection control device according to the second embodiment.

An HUD device 10A according to a second embodiment will be described below with reference to FIG. 11 to FIG. 13. FIG. 11 is a block diagram illustrating a configuration example of an on-vehicle projection control device according to the second embodiment. FIG. 12 is a diagram illustrating an example of a reference position determination image displayed by the on-vehicle projection control device according to the second embodiment. FIG. 13 is a flowchart illustrating a flow of processes performed by the on-vehicle projection control device according to the second embodiment. A basic configuration of the HUD device 10A is the same as that of the HUD device 10 of the first embodiment. In the following description, the same components as those of the HUD device 10 are denoted by the same or corresponding reference symbols, and detailed explanation thereof will be omitted. The second embodiment is different from the first embodiment in that the HUD device 10A includes a face data acquisition unit 46A, and a detection unit 43A and a projection control unit 45A perform different processes.

The projected light of the reference position determination image 100 passes through the same optical path as the optical path of the projected light of the display image 200 that is applied at the time of normal use. Then, as illustrated in FIG. 12, the reference position determination image 100 is projected below the projection position of the display image 200.

The HUD device 10A controls the camera 20 to capture video data of the face of the driver M as initial setting. Face data is video data by which arrangement and a distance of each of parts of the face are detectable. For example, the face data is video data by which a distance between eyes E (see FIG. 2) and a predetermined position on the face is detectable. The face data that is video data of the captured face is stored in the storage.

The face data acquisition unit 46A acquires the face data stored in the storage.

The detection unit 43A detects the relative positional relationship between the reference position determination image 100 and the pupils of the driver M, based on the face data acquired by the face data acquisition unit 46A and based on the pupil position of the driver M and the reference position determination image 100 in the captured video data. The reference position determination image 100 is projected below the projection position of the display image 200. However, the detection unit 43A is able to detect the relative positional relationship of the pupil position of the driver M with respect to the virtual image of the display image 200 by referring to the face data.

As illustrated in FIG. 12, at the time of the position adjustment, the projection control unit 45A controls the projection of the reference position determination image 100 such that the projected light of the reference position determination image 100 is projected on a lower side of the eyes E on the face of the driver M, based on the face data acquired by the face data acquisition unit 46A. At the time of the position adjustment, the projection control unit 45A projects the projected light of the reference position determination image 100 through the same optical path as the optical path of the projected light of the display image 200 that is applied at the time of normal use. Then, the projection control unit 45A projects the reference position determination image 100 below the projection position of the display image 200.

A flow of processes performed by an on-vehicle projection control device 40A will be described below with reference to FIG. 13. The processes at Step S21, Step S24, Step S25, and Step S27 to Step S30 in the flowchart illustrated in FIG. 13 are the same as the processes at Step S11, Step S13, Step S14, and Step S16 to Step S19 in the flowchart illustrated in FIG. 8.

The on-vehicle projection control device 40A acquires the face data (Step S22). More specifically, the on-vehicle projection control device 40A controls the face data acquisition unit 46A to acquire the face data stored in the storage. The on-vehicle projection control device 40A proceeds to Step S23.

The on-vehicle projection control device 40 projects the reference position determination image 100 on the lower side of the eyes E on the face of the driver M (Step S23). More specifically, the on-vehicle projection control device 40 controls the projection control unit 45 to output the control signal for projecting the reference position determination image 100, which is generated by the reference position determination image generation unit 41, on the lower side of the eyes E on the face of the driver M. The on-vehicle projection control device 40 proceeds to Step S24.

The on-vehicle projection control device 40A detects the pupil position based on the face data (Step S26). More specifically, the on-vehicle projection control device 40A controls the detection unit 43A to perform an image processing on the face data and the captured video data and detects the relative positional relationship between the reference position determination image 100 and the pupils of the driver M. The on-vehicle projection control device 40A controls the detection unit 43A to detect a misalignment amount of the pupil position of the driver M. The on-vehicle projection control device 40A proceeds to Step S27.

As described above, in the second embodiment, at the time of position adjustment, the projected light of the reference position determination image 100 is projected on the lower side of the eyes E on the face of the driver M. According to the second embodiment, it is possible to prevent the projected light of the reference position determination image 100 from entering the pupils of the driver M. Therefore, according to the second embodiment, it is possible to prevent the driver M from feeling dazzled by the projected light of the reference position determination image 100.

Third Embodiment

Figure 14:
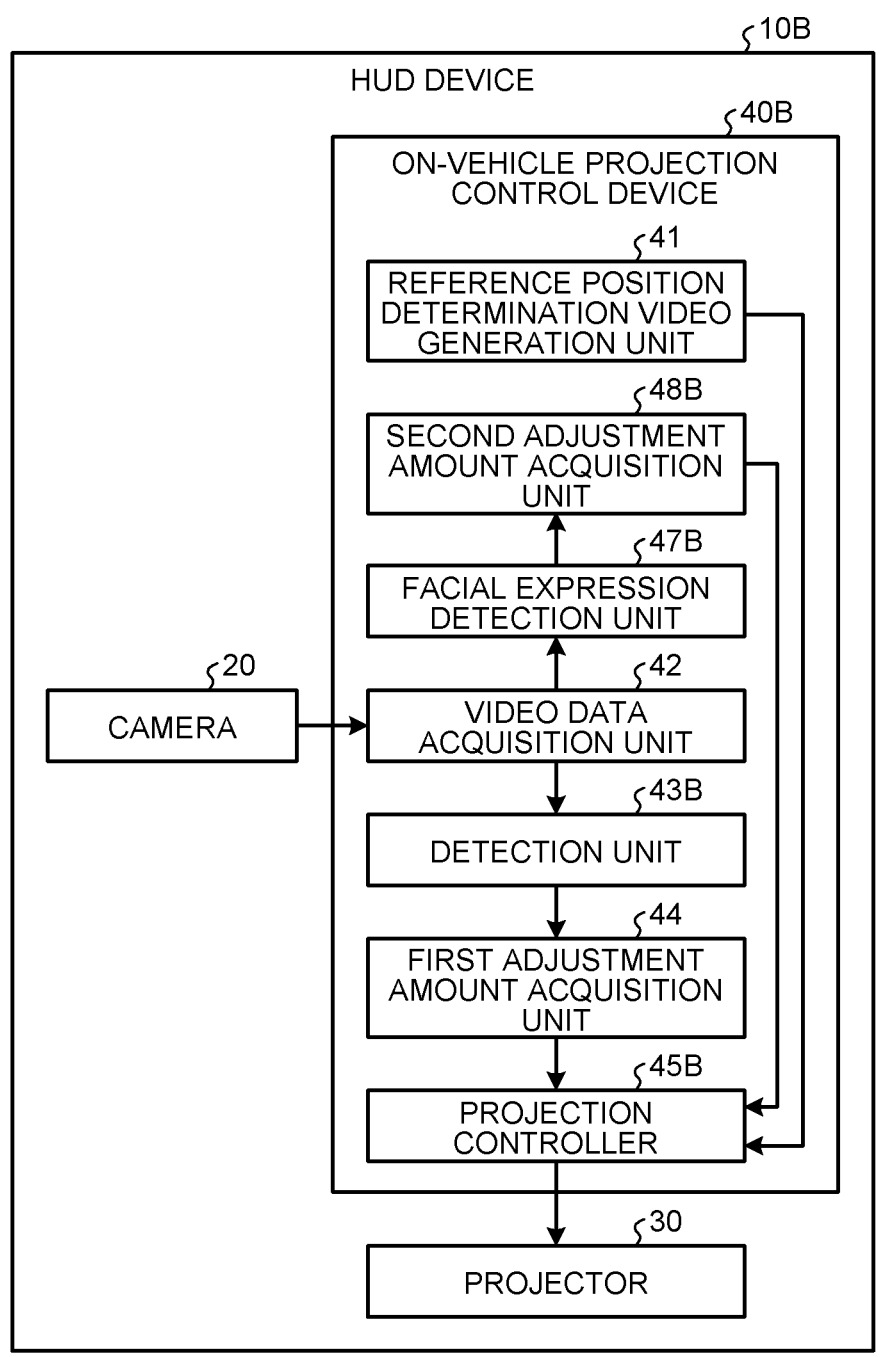
FIG. 14 is a block diagram illustrating a configuration example of an on-vehicle projection control device according to a third embodiment.
Figure 15:
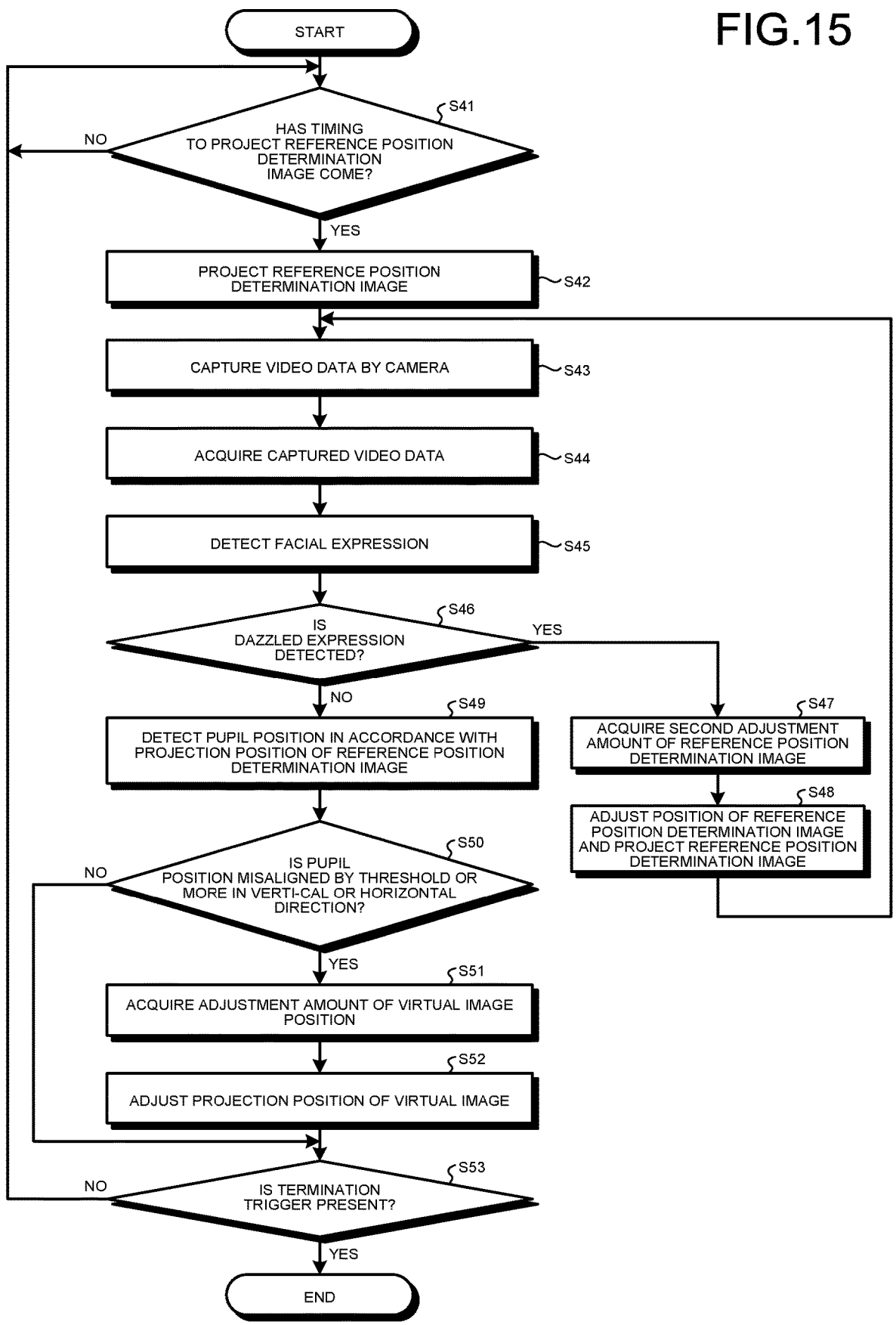
FIG. 15 is a flowchart illustrating a flow of processes performed by the on-vehicle projection control device according to the third embodiment.

A HUD device 10B according to a third embodiment will be described with reference to FIG. 14 and FIG. 15. FIG. 14 is a block diagram illustrating a configuration example of an on-vehicle projection control device according to the third embodiment. FIG. 15 is a flowchart illustrating a flow of processes performed by the on-vehicle projection control device according to the third embodiment. A basic configuration of the HUD device 10B is the same as the HUD device 10 of the first embodiment. The third embodiment is different from the first embodiment in that an on-vehicle projection control device 40B in the HUD device 10B performs a different process.

The on-vehicle projection control device 40B includes the reference position determination image generation unit 41, the video data acquisition unit 42, a detection unit 43B, a first adjustment amount acquisition unit 44 that has the same functions as those of the adjustment amount acquisition unit 44 of the first embodiment, a projection control unit 45B, a facial expression detection unit 47B, and a second adjustment amount acquisition unit 48B.

The facial expression detection unit 47B performs an image processing on the captured video data, and detects a dazzled expression of the driver M. For example, the facial expression detection unit 47B detects, as the dazzled expression, a facial expression indicating that the driver M narrows or closes his/her eyes at the time of the position adjustment, based on the captured video data.

The second adjustment amount acquisition unit 48B acquires a second adjustment amount of the projection position of the reference position determination image 100 such that the first reference position determination image 101 and the second reference position determination image 102 of the reference position determination image 100 are located outside of the eyes of the driver M. More specifically, the second adjustment amount acquisition unit 48B moves the projection position of the reference position determination image 100 in the vertical direction or the horizontal direction and acquires the second adjustment amount by which the first reference position determination image 101 and the second reference position determination image 102 are located at positions outside of the eyes of the driver M.

when the projection position of the reference position determination image 100 is not moved by the second adjustment amount, the detection unit 43B detects at least one of the vertical position and the horizontal position of the pupil position of the driver M with respect to the virtual image of the display image 200, similarly to the first embodiment. When the projection position of the reference position determination image 100 is moved by the second adjustment amount, the detection unit 43B detects at least one of the vertical position and the horizontal position of the pupil position of the driver M with respect to the virtual image of the display image 200, based on the pupil position of the driver M and the reference position determination image 100 in the captured video data and based on the second adjustment amount. In other words, when the projection position of the reference position determination image 100 is moved by the second adjustment amount, the detection unit 43B detects at least one of the vertical position and the horizontal position of the pupil position of the driver M by taking into account the adjustment of the position of the reference position determination image 100.

When the dazzled expression of the driver M at the time of position adjustment is detected, the projection control unit 45B controls the projection of the reference position determination image 100 such that the projected light of the reference position determination image 100 is projected so as to be located outside of the positions of the eyes of the driver M.

A flow of processes performed by the on-vehicle projection control device 40B will be described below with reference to FIG. 15. The processes at Step S41 to Step S44 and Step S50 to Step S53 in the flowchart illustrated in FIG. 15 are the same as the processes at Step S11 to Step S14 and Step S16 to Step S19 in the flowchart illustrated in FIG. 8.

The on-vehicle projection control device 40B detects a facial expression (Step S45). More specifically, the on-vehicle projection control device 40B controls the facial expression detection unit 47B to perform an image processing on the captured video data and detects the dazzled expression of the driver M.

The on-vehicle projection control device 40B determines whether the dazzled expression is detected (Step S46). More specifically, when the on-vehicle projection control device 40B detects the dazzled expression of the driver M based on a detection result of the facial expression detection unit 47B (Yes at Step S46), the process proceeds to Step S47. When the on-vehicle projection control device 40B does not detect the dazzled expression of the driver M based on the detection result of the facial expression detection unit 47B (No at Step S46), the process proceeds to Step S49.

When the dazzled expression is detected (Yes at Step S46), the on-vehicle projection control device 40B acquires the second adjustment amount of the reference position determination image 100 (Step S47). More specifically, the on-vehicle projection control device 40B controls the second adjustment amount acquisition unit 48B to acquire the second adjustment amount of the projection position of the reference position determination image 100 such that the first reference position determination image 101 and the second reference position determination image 102 of the reference position determination image 100 are located outside of the eyes of the driver M. The on-vehicle projection control device 40B proceeds to Step S48.

The on-vehicle projection control device 40B adjusts the position of the reference position determination image 100 and projects the reference position determination image 100 (Step S48). The on-vehicle projection control device 40B controls the projection control unit 45B to output the control signal for projecting the reference position determination image 100 for which the position has been adjusted, based on the second adjustment amount acquired by the second adjustment amount acquisition unit 48B. The on-vehicle projection control device 40B performs the process at Step S43 again.

When the dazzled expression is not detected (No at Step S46), the on-vehicle projection control device 40B detects the pupil position in accordance with the projection position of the reference position determination image 100 (Step S49). When the projection position of the reference position determination image 100 is not adjusted at Step S48, the on-vehicle projection control device 40B controls the detection unit 43B to perform the same process as the process at Step S15. When the projection position of the reference position determination image 100 is moved by the second adjustment amount at Step S48, the on-vehicle projection control device 40B controls the detection unit 43B to detect at least one of the vertical position and the horizontal position of the pupil position of the driver M by taking into account the adjustment of the position of the reference position determination image 100. The on-vehicle projection control device 40B proceeds to Step S50.

As described above, in the third embodiment, when the dazzled expression of the driver M is detected at the time of the position adjustment, the projected light of the reference position determination image 100 is projected such that the position is adjusted so as to be located outside of the eyes E on the face of the driver M. Therefore, in the third embodiment, it is possible to prevent the driver M from feeling dazzled by the projected light of the reference position determination image 100 at the time of the position adjustment.

Fourth Embodiment

Figure 16:
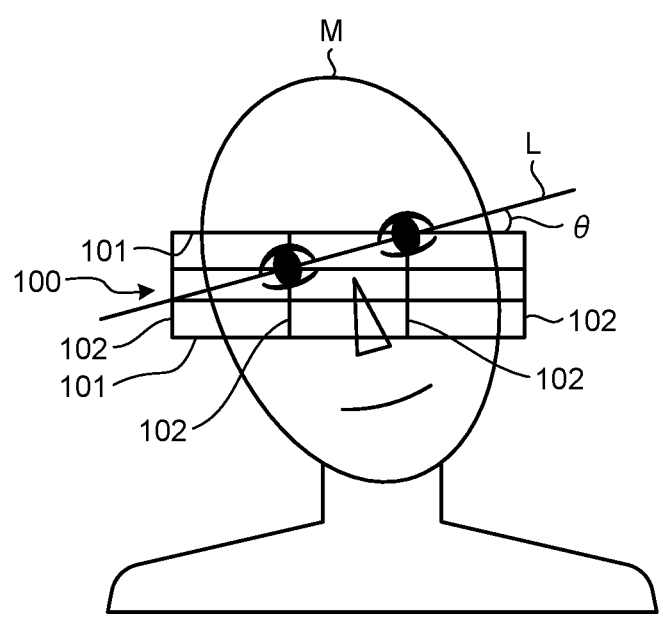
FIG. 16 is a diagram illustrating an example of a pupil position of a driver detected by an on-vehicle projection control device according to a fourth embodiment.
Figure 17:
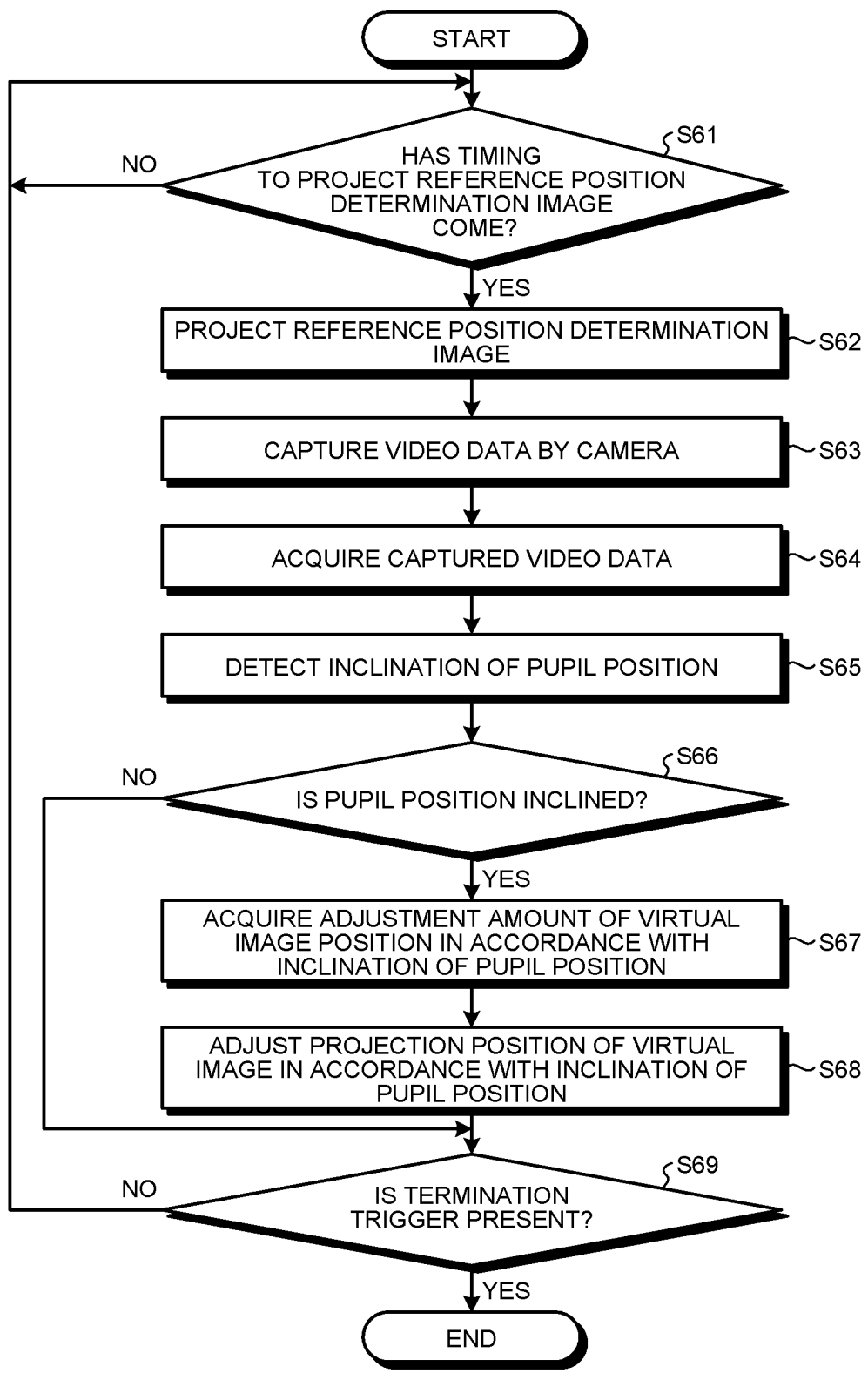
FIG. 17 is a flowchart illustrating a flow of processes performed by the on-vehicle projection control device according to the fourth embodiment.

A HUD device 10 according to a fourth embodiment will be described below with reference to FIG. 16 and FIG. 17. FIG. 16 is a diagram illustrating an example of the pupil position of the driver detected by the on-vehicle projection control device according to the fourth embodiment. FIG. 17 is a flowchart illustrating a flow of processes performed by the on-vehicle projection control device according to the fourth embodiment. A basic configuration of the HUD device 10 is the same as that of the HUD device 10 of the first embodiment. The fourth embodiment is different from the first embodiment in that the on-vehicle projection control device 40 in the HUD device 10 performs different processes.

The detection unit 43 detects an inclination of pupil position of the driver M with respect to the virtual image of the display image 200, based on the pupil position of the driver M data and the reference position determination image 100 in the captured video. More specifically, the detection unit 43 performs an image processing on the captured video data and detects, as an angle θ, an inclination of a straight line L which connects left and right pupil position of the driver M, with respect to the first reference position determination image 101.

The inclination of the pupil position of the driver M with respect to the virtual image of the display image 200 will be described below with reference to FIG. 16. For example, when a centrifugal force acts while the vehicle is travelling around a curve, the face of the driver M may be inclined as illustrated in FIG. 16. As illustrated in FIG. 16, when the reference position determination image 100 has a lattice shape, and when the straight line L that connects the left and right pupil position of the driver M is inclined with respect to the first reference position determination image 101, the detection unit 43 detects that the pupil position of the driver M is inclined. Further, the detection unit 43 detects the angle θ of the inclination of the pupil position of the driver M.

The adjustment amount acquisition unit 44 acquires an adjustment amount of a position of a virtual image that is projected on the front, based on a relative positional relationship of the pupil position of the viewer with respect to the virtual image detected by the detection unit 43. More specifically, the adjustment amount acquisition unit 44 calculates an adjustment amount of the display image 200 such that even when the pupil position of the driver M are inclined, the virtual image of the display image 200 can be viewed without distortion. For example, the adjustment amount acquisition unit 44 may acquire an adjustment amount of an optical mechanism such that the virtual image of the display image 200 can be viewed without distortion, based on the angle θ of the inclination of the pupil position of the driver M detected by the detection unit 43. Alternatively, for example, the adjustment amount acquisition unit 44 may acquire an adjustment amount in an image correction process that is performed at the virtual image position such that the virtual image of the display image 200 can be viewed without distortion, based on the angle θ of the inclination of the pupil position of the driver M detected by the detection unit 43. Still alternatively, for example, the adjustment amount acquisition unit 44 may acquire an adjustment amount of the display position of the display image 200 to be displayed on the display unit 31 such that the virtual image of the display image 200 can be viewed without distortion, based on the angle θ of the inclination of the pupil position of the driver M detected by the detection unit 43.

The projection control unit 45 controls projection such that the position of the virtual image projected on the front is adjusted, based on the adjustment amount acquired by the adjustment amount acquisition unit 44. More specifically, when the pupil position of the driver M are inclined, the projection control unit 45 controls the adjustment and the projection of the display image 200 such that the virtual image of the display image 200 can be viewed without distortion on the front of the vehicle. For example, the projection control unit 45 may adjust an optical mechanism based on the adjustment amount acquired by the adjustment amount acquisition unit 44, and project the adjusted display image 200. Alternatively, for example, the projection control unit 45 may perform an image correction process based on the adjustment amount acquired by the adjustment amount acquisition unit 44, and project the adjusted display image 200. Still alternatively, for example, the projection control unit 45 may adjust the display position of the display image 200 displayed on the display unit 31 based on the adjustment amount acquired by the adjustment amount acquisition unit 44, and project the adjusted display image 200.

A flow of processes performed by the on-vehicle projection control device 40 will be described below with reference to FIG. 17. The processes at Step S61 to Step S64, and Step S69 in the flowchart illustrated in FIG. 17 are the same as the processes at Step S11 to Step S14 and Step S19 in the flowchart illustrated in FIG. 8.

The on-vehicle projection control device 40 detects the inclination of the pupil position (Step S65). More specifically, the on-vehicle projection control device 40 controls the detection unit 43 to perform the image processing on the captured video data, and detect the angle θ of the inclination of the pupil position of the driver M with respect to the virtual image of the display image 200. The on-vehicle projection control device 40 proceeds to Step S66.

The on-vehicle projection control device 40 determines whether the pupil position are inclined (Step S66). More specifically, when the angle θ of the inclination of the pupil position of the driver M detected by the detection unit 43 is equal to or larger than a threshold, the on-vehicle projection control device 40 determines that the pupil position are inclined (Yes at Step S66), and proceeds to Step S67. When the angle θ of the inclination of the pupil position of the driver M detected by the detection unit 43 is not equal to or larger than the threshold, the on-vehicle projection control device 40 determines that the pupil position are not inclined (No at Step S66), and proceeds to Step S69.

When it is determined that the pupil position of the driver M are inclined (Yes at Step S66), the on-vehicle projection control device 40 acquires the adjustment amount of the virtual image position in accordance with the inclination of the pupil position (Step S67). More specifically, the on-vehicle projection control device 40 controls the adjustment amount acquisition unit 44 to acquire the adjustment amount of the display image 200 base on the inclination of the pupil position of the driver M detected by the detection unit 43. The on-vehicle projection control device 40 proceeds to Step S68.

The on-vehicle projection control device 40 adjusts the projection position of the virtual image in accordance with the inclination of the pupil position (Step S68). The on-vehicle projection control device 40 controls the projection control unit 45 to output the control signal for projecting the reference position determination image 100 for which the position has been adjusted, based on the adjustment amount acquired by the adjustment amount acquisition unit 44. The on-vehicle projection control device 40 proceeds to Step S69.

As described above, in the fourth embodiment, the projection position of the virtual image is adjusted in accordance with the inclination of the pupil position. Therefore, in the fourth embodiment, it is possible to allow the virtual image of the display image 200 to be viewed without distortion. For example, in the fourth embodiment, even when the face of the driver M is inclined while the vehicle is travelling around a curve, it is possible to allow the virtual image of the display image 200 to be viewed without distortion.

While the HUD device 10 according to the present application has been described above, the present application may be embodied in various different modes other than the embodiments as described above.

The components of the HUD device 10 illustrated in the drawings are functionally conceptual and need not necessarily be physically configured in the manner as illustrated in the drawings. In other words, specific forms of the devices are not limited to those illustrated in the drawings, and all or part of the devices may be functionally or physically distributed or integrated in arbitrary units.

The configuration of the HUD device 10 is realized as, for example, software by a program or the like loaded on a memory. In the embodiments described above, functional blocks that are realized by cooperation of hardware or software have been described. In other words, the functional blocks may be realized in various forms by only hardware, by only software, or by a combination of hardware and software.

The components described above include one that can easily be thought of by a person skilled in the art and one that is practically identical. Further, the configurations as described above may be combined appropriately. Furthermore, within the scope not departing from the gist of the present application, various omission, replacement, and modification of the components may be made.

While the projector 30 is described such that the windshield S serves as the reflection unit, the reflection unit is not limited to this example. For example, it may be possible to use a combiner as the reflection unit.

The reference position determination image 100 is not limited to one that uses visible light, but may be one that uses infrared light. When the infrared light is used for the reference position determination image 100, the camera 20 is configured as an infrared camera capable of capturing the infrared light. By using the infrared light for the reference position determination image 100, it becomes possible to detect the pupil position of the driver M without making the driver M aware that the projected light of the reference position determination image 100 is projected on the face of the driver M.

Further, with use of the reference position determination image 100 that is projected on the face of the driver and captured by the camera 20, it is possible to detect display luminance of the reference position determination image 100 and the display image 200. The on-vehicle projection control device 40 may perform a process of performing projection while adjusting contrast of the display image 200 while the vehicle is travelling in a tunnel or while afternoon sunlight enters the vehicle, in accordance with the detected display luminance.

According to the present application, it is possible to detect a relative positional relationship of a pupil position of a viewer with respect to a virtual image.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection control device comprising:
   a projection controller configured to control a projector of a head-up display device to project a display image such that a virtual image thereof is viewed in front of a viewer and to control the projector to project a reference position determination image on a lower side of eyes of a face of the viewer;
   a video data acquisition unit configured to acquire a captured video that is captured by an imager capable of capturing a video of the face of the viewer; and
   a detection unit configured to detect a relative positional relationship of a pupil position of the viewer with respect to the virtual image based on the captured video that is obtained by capturing the reference position determination image projected on the viewer and based on face data that is imaged to be stored in advance and by which a distance between the eyes of the viewer and a predetermined position of the face of the viewer is detectable,
   wherein the projection controller is further configured to control the projector to project only the reference position determination image when the detection unit detects the relative positional relationship.

2. The projection control device according to claim 1, wherein the reference position determination image comprises at least one of a first reference position determination image indicating a reference position in a vertical direction and a second reference position determination image indicating a reference position in a horizontal direction.

3. The projection control device according to claim 1, further comprising:
   an adjustment amount acquisition unit configured to acquire an adjustment amount of a position of the virtual image that is projected in front of the viewer, based on the relative positional relationship, detected by the detection unit, of the pupil position of the viewer with respect to the virtual image,
   wherein the projection control unit is further configured to adjust the position of the display image projected in front of the viewer based on the adjustment amount acquired by the adjustment amount acquisition unit.

4. A head-up display device comprising:
   the projection control device according to claim 1; and
   at least one of the projector and the imager.

5. A projection control method comprising:
   controlling a projector of a head-up display device to project a display image such that a virtual image thereof is viewed in front of a viewer;
   controlling the projector to project a reference position determination image on a lower side of eyes on a face of the viewer;
   acquiring a captured video that is captured by an imager capable of capturing a video of the face of the viewer; and
   detecting a relative positional relationship of a pupil position of the viewer with respect to the virtual image based on the captured video that is obtained by capturing the reference position determination image projected on the viewer and based on face data which is imaged to be stored in advance and by which a distance between the eyes of the viewer and a predetermined position of the face of the viewer is detectable,
   wherein the controlling further controls the projector to project only the reference position determination image when detecting the relative positional relationship.

6. A non-transitory computer readable storage medium that stores a computer program for causing a computer to execute:
   controlling a projector of a head-up display device to project a display image such that a virtual image thereof is viewed in front of a viewer and controlling the projector to project a reference position determination image on a lower side of eyes on a face of a viewer;
   acquiring a video data that is captured by an imager capable of capturing a video of the face of the viewer; and
   detecting a relative positional relationship of a pupil position of the viewer with respect to the virtual image, wherein
   the detecting comprises detecting the relative positional relationship of the pupil position of the viewer with respect to the virtual image based on the captured video that is obtained by capturing the reference position determination image projected on the viewer and based on face data which is imaged to be stored in advance and by which a distance between the eyes of the viewer and a predetermined position of the face of the viewer is detectable, wherein the controlling further controls the projector to project only the reference position determination image when detecting the relative positional relationship.

* * * * *